United States Patent
Jeuk et al.

(10) Patent No.: US 9,729,406 B2
(45) Date of Patent: Aug. 8, 2017

(54) CLOUD PROVIDER, SERVICE, AND TENANT CLASSIFICATION IN CLOUD COMPUTING

(71) Applicant: Cisco Technology, Inc., San Jose, CA (US)

(72) Inventors: Sebastian Jeuk, San Jose, CA (US); Gonzalo Salgueiro, Raleigh, NC (US); Frederick Juergens Baker, Goleta, CA (US)

(73) Assignee: Cisco Technology, Inc., San Jose, CA (US)

( * ) Notice: Subject to any disclaimer, the term of this patent is extended or adjusted under 35 U.S.C. 154(b) by 196 days.

(21) Appl. No.: 14/806,998

(22) Filed: Jul. 23, 2015

(65) Prior Publication Data

US 2016/0323183 A1 Nov. 3, 2016

Related U.S. Application Data (60) Provisional application No. 62/154,923, filed on Apr. 30, 2015.

(51) Int. Cl.
*G06F 15/173* (2006.01)
*H04L 12/24* (2006.01)
(Continued)

(52) U.S. Cl.
CPC .......... *H04L 41/5058* (2013.01); *H04L 61/20* (2013.01); *H04L 61/6004* (2013.01); *H04L 41/5096* (2013.01); *H04L 45/64* (2013.01); *H04L 45/74* (2013.01); *H04L 61/15* (2013.01); *H04L 61/3065* (2013.01); *H04L 61/609* (2013.01)

(58) Field of Classification Search
CPC ... H04L 41/0806; H04L 45/74; H04L 45/741; H04L 45/021
USPC ........................................................ 709/226
See application file for complete search history.

(56) References Cited

U.S. PATENT DOCUMENTS

| | | | |
|---|---|---|---|
| 2014/0075501 A1* | 3/2014 | Srinivasan | G06F 21/62 726/1 |
| 2014/0169215 A1* | 6/2014 | Rajendran | H04L 41/0806 370/254 |
| 2015/0264200 A1* | 9/2015 | Ando | H04N 1/0097 358/1.15 |

OTHER PUBLICATIONS

Baker et al., "A Model for IPv6 Operation in OpenStack", Internet Draft, Cisco Systems, Feb. 8, 2015, 38 pages.
(Continued)

*Primary Examiner* — Glenford Madamba
(74) *Attorney, Agent, or Firm* — Edell, Shapiro & Finnan, LLC (57) ABSTRACT

A cloud provider supports cloud-based services accessible to tenants of the cloud provider over a network. In the cloud provider, classification information including a cloud-identifier to identify the cloud provider, service-identifiers each to identify a respective one of the services, and tenant-identifiers each to identify a respective one of the tenants is maintained. The classification information is distributed within the cloud provider, including to the services, and may also be distributed outside of the cloud provider, to enable a respective tenant to exchange IP packets with, and thereby access, a respective service based on the classification information, wherein each IP packet includes the cloud-identifier, the service-identifier of the respective service, and the tenant-identifier of the respective tenant.

20 Claims, 7 Drawing Sheets

(51) Int. Cl.
H04L 12/741 (2013.01)
H04L 12/715 (2013.01)
H04L 29/12 (2006.01)

(56) References Cited

OTHER PUBLICATIONS

Jeuk et al., "Universal Cloud Classification (UCC) and its Evaluation in a Data Center Environment", 2014 IEEE 6th International Conference on Cloud Computing Technology and Science, Dec. 15-Dec. 18, 2014, 6 pages.

Jeuk et al., "Towards Cloud, Service and Tenant Classification for Cloud Computing", 2014 14th IEEE/ACM International Symposium on Cluster, Cloud and Grid Computing, May 26-May 29, 2014, 10 pages.

Deering et al., "Internet Protocol, Version 6 (IPv6)", Cisco, Dec. 1998, 39 pages.

* cited by examiner

| CLOUD-ID | ID VALUE (NUMERIC - 48 BIT) |
|---|---|
| AMAZON | 001.1310010 |
| GOOGLE | 001.1310020 |
| MICROSOFT | 001.1310030 |
| NIRVANIX | 001.1310040 |

| SERVICE-ID | ID VALUE (NUMERIC - 6 BYTE) |
|---|---|
| DROPBOX | 001.2535200000.000 |
| S3 | 002.2394800000.000 |
| SALESFORCE | 001.0061700000.000 |

| TENANT-ID | BITS |
|---|---|
| LAYER 2 TENANT-ID | 16 BIT VALUE |
| METADATA | 32 BIT VALUE |

FIG.9

CLOUD PROVIDER, SERVICE, AND TENANT CLASSIFICATION IN CLOUD COMPUTING

PRIORITY CLAIM

This application claims priority to U.S. Provisional Application No. 62/154,923, filed Apr. 30, 2015, the entirety of which is incorporated herein by reference.

TECHNICAL FIELD

The present disclosure relates to cloud computing.

BACKGROUND

Entities in a cloud computing environment include cloud providers, cloud services supported by the cloud providers, and tenants or consumers that use the cloud services. While multi-tenancy (i.e., offering of services across many tenants within a cloud provider) is an important aspect of cloud computing, conventional techniques to identify the cloud computing entities do not allow classification and isolation on a per-cloud, per-service, and per-tenant basis at the network layer.

DESCRIPTION OF EXAMPLE EMBODIMENTS

Overview

A cloud provider supports cloud-based services accessible to tenants of the cloud provider over a network. In the cloud provider, classification information including a cloud-identifier to identify the cloud provider, service-identifiers each to identify a respective one of the services, and tenant-identifiers each to identify a respective one of the tenants is maintained. The classification information is distributed within the cloud provider, including to the services, to enable a respective tenant to exchange (Internet Protocol) IP packets with, and thereby access, a respective service based on the classification information, wherein each IP packet includes the cloud-identifier, the service-identifier of the respective service, and the tenant-identifier of the respective tenant. The classification information may also be distributed outside of the cloud provider as needed.

Example Embodiments

In a cloud computing environment, conventional techniques do not allow classification and isolation on a per-cloud, per-service, and per-tenant basis at the network layer of the Open Systems Interconnection (OSI) model. Multi-tenancy is a critical aspect of cloud computing; however, the conventional techniques to define multi-tenancy in the networks are not sufficient for cloud environments.

Conventional classification is typically based on Internet Protocol (IP) prefixes or addresses, protocol numbers identifying, for example, Transmission Control Protocol (TCP) or User Datagram Protocol (UDP), TCP/UDP port numbers and higher layer identities. These isolation techniques are used to identify individual endpoints and applications hosted; however, in cloud computing, providers host many different services on top of the same UDP/TCP ports, and the same range of public IP addresses across many endpoints. There is currently no service-awareness in networks, which is critical to properly isolate providers, theirs services and tenants.

These challenges magnify in the case of running services across multiple clouds (InterCloud use-case). Classification becomes even more critical with multi-tenancy and tenant/service mobility across clouds. Traffic between cloud environments needs to be affiliated to its originating cloud provider and services.

With the introduction of cloud computing, ways to adapt network identifiers (IDs) to the virtualized, dynamic and agile infrastructure of a cloud environment have been tried. In legacy networks, matching traffic against their Virtual Local Area Network (VLAN), IP or port affiliation often has been granular enough to accurately define business related policies; however, with cloud computing, simply relying on VLANs, IP addresses or port numbers as classification mechanisms is not sufficient. Classifying traffic based on network IDs requires deep-packet-inspection. This typically results in high latency for the tenant.

Virtual Extensible Local Area Networks (VxLANs) have been introduced recently to circumvent the limitations providers faced using VLANs. VxLAN now offers a 24-bit network segmentation ID. Even though it might address the scale limitations of VLANs, it still lacks the cloud computing specific classification and separation of providers, services and tenants.

Figure 1:
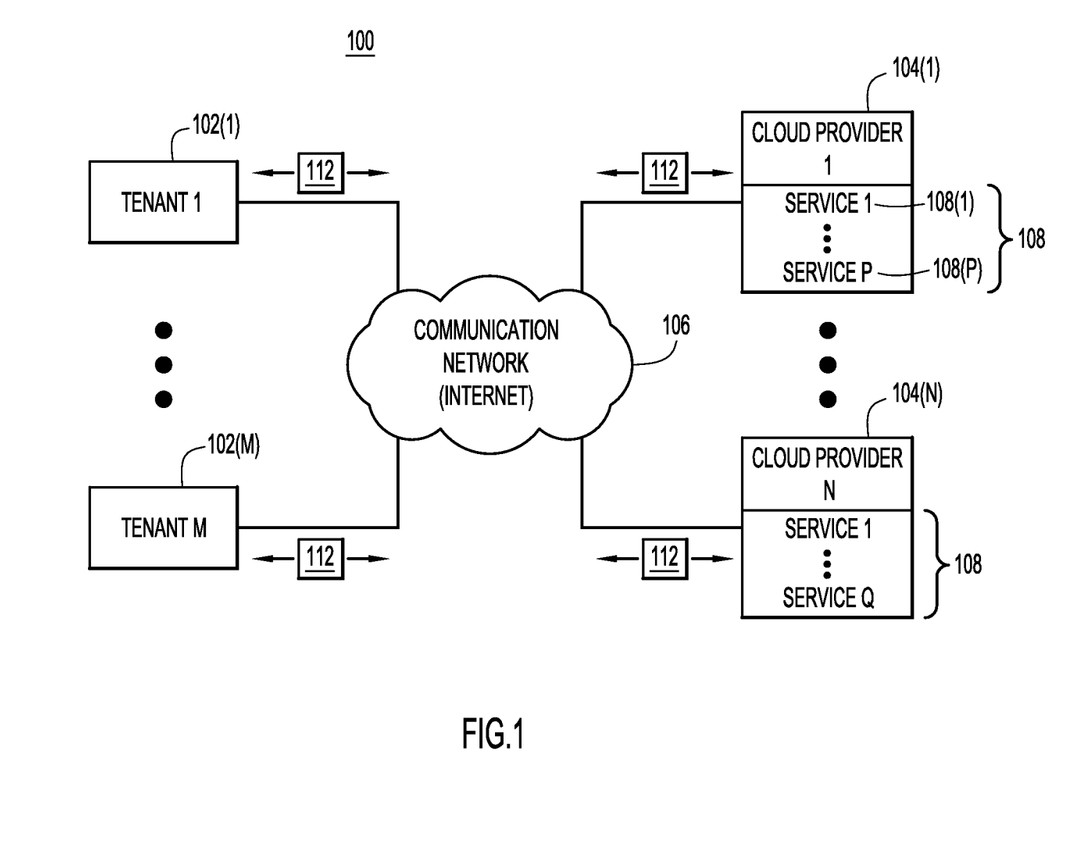
FIG. 1 is a block diagram of an example cloud computing environment in which embodiments directed to cloud provider, service, and tenant classification may be implemented, according to an example embodiment.

With reference to FIG. 1, there is a block diagram of an example cloud computing environment 100 in which embodiments directed to cloud provider, service, and tenant classification may be implemented. Cloud computing environment 100 includes multiple tenants 102(1)-102(M) and multiple cloud providers 104(1)-104(N) connected with a communication network 106. Communication network 106 may include one or more wide area networks (WANs) such as the Internet and one or more local area networks (LANs). Tenants 102 include, but are not limited to, computer devices and applications operated by associated individual clients or, alternatively, organizations, such as corporate entities.

Cloud providers 104 may include data centers that provide data center infrastructure, including compute, storage, and network resources (not shown in FIG. 1). The computer, storage, and network resources of cloud providers 104 host and support respective cloud computing services 108 (also referred to as "cloud services" 108 or simply "services" 108) consumed by tenants 102 that are registered to the cloud services. For example, computer servers of each cloud provider 104(*i*) host the cloud services in that cloud provider, and network devices, such as network switches and routers, provide connectivity between the servers and internal networks of the cloud provider and external networks (such as network 106). In the example of FIG. 1, cloud provider 104(1) provides cloud services 108(1)-108(P) while cloud provider 104(N) provides cloud services 108 (1)-108(Q). Cloud services 108 may include Software-as-a-Service and/or Infrastructure-as-a-Service, or a mixture of the two types of services.

Tenants 102 communicate with cloud providers 104 and services 108 therein through network 106 and in this way access the services offered by the cloud providers. Such communication may include an exchange of IP packets 112 between tenants 102, cloud providers 104, and services 108 in the cloud providers, for example. IP packets 112 may include IP packets formatted in accordance with IPv4, IPv6, or any other presently known or hereafter developed IP format.

Embodiments presented herein implement a hierarchical classification scheme (also referred to as a "generic hierarchical identification scheme" and "Universal Cloud Classification (UCC)") that uses multiple identifiers (IDs) to identify cloud providers 104, their respective services 108, and tenants 102 in an end-to-end connection between the tenants and services used thereby. In an embodiment, the UCC IDs are embedded into IP packets 112 and various databases accessible to tenants 102, cloud providers 104, and services 108. The UCC IDs may be distributed/transported within a given cloud provider 104(*i*), and also outside of the given cloud provider 104(*i*), e.g., to other cloud providers and cloud provider networks, tenants, and services, as necessary to implement the methods described herein. Structurally, the UCC IDs are loosely based on a "Digital Object Identifier" (DOI) scheme that creates hierarchical sub-identifiers within each ID. The scheme includes 3 main UCC IDs including (i) a cloud-ID to identify a cloud provider, (ii) a service-ID to identify a service within a cloud provider, and (iii) a tenant-ID with cloud provider significance, meaning a tenant-ID registered with a given cloud provider. Examples of the three UCC IDs (referred to simply as "IDs") are illustrated in FIGS. 2-4.

Figure 2:
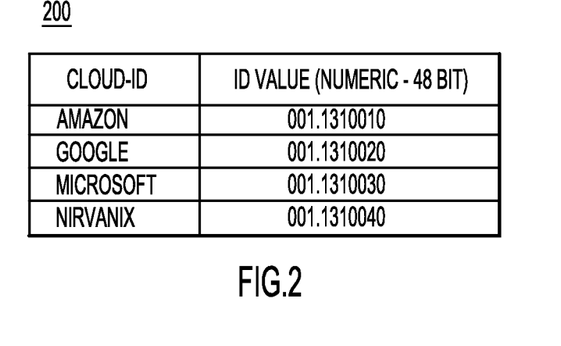
FIG. 2 is an illustration of example cloud-identifiers (cloud-IDs) used to identify cloud providers, according to an example embodiment.

With reference to FIG. 2, there is an illustration of example cloud-IDs 200 to identify cloud providers in the database globally (in the geographic sense). A registry of cloud provider IDs service similar to a domain name service (DNS) may be used to manage the cloud-IDs, their assignments and purge. Each cloud-ID in cloud-IDs 200 has a name (e.g., "Amazon") and a value (e.g., 001.1310010) that is split into two sections. A first section (e.g., 001) identifies the registry location, and a second section (e.g., 1310010) provides a unique cloud provider ID/number in that region. This way, cloud-IDs 200 may be used to determine the origin of flows to and from a particular cloud provider. This is useful to allow/disallow flows depending on their origins to comply with certain law requirements (i.e. data hosted in a data center located in America is not allowed to be accessed in Europe).

Figure 3:
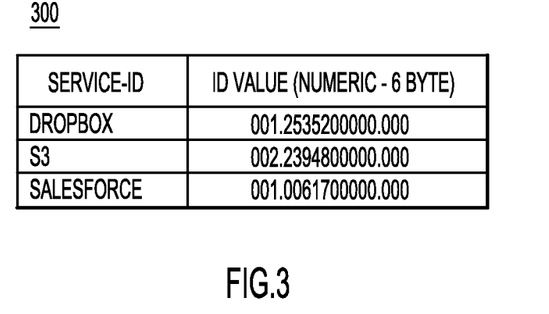
FIG. 3 is an illustration of example service-IDs used to identify a service within/provided by a cloud provider, according to an example embodiment.

With reference to FIG. 3, there is an illustration of example service-IDs 300 to identify services within a cloud provider. In an example, each of service-IDs 300 includes a name (e.g., Dropbox) and a value having 6-bytes for 3 sub-IDs that identify a data center of a cloud provider (e.g., the left-most field to the left of the left-most decimal point), a service in the data center (the center field between the decimal points), and an optional field (the right-most field).

Figure 4:
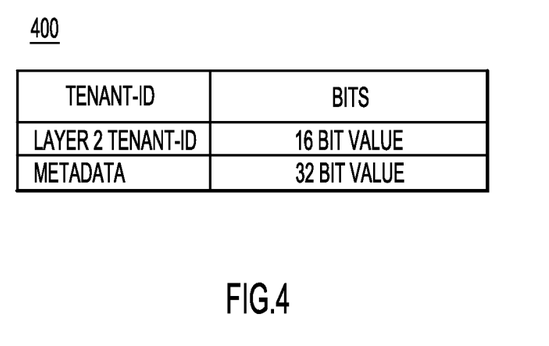
FIG. 4 is an illustration of example tenant-IDs used to identify tenants, according to an example embodiment.

With reference to FIG. 4, there is an illustration of example tenant-IDs 400. In an example, each tenant-ID of tenant-IDs 400 includes a name and a value of 6 bytes to define a tenant-ID with cloud provider significance. Each tenant-ID of tenant-IDs 400 identifies a consumer of a service, i.e., the tenant, of a cloud provider.

As mentioned above, tenants 102 exchange network packets, e.g., IP packets 112, with cloud providers 104 and services 108 therein to access the services. In an embodiment, the three IDs (e.g., from cloud-IDs 200, service-IDs 300, and tenant-IDs 400) may be collectively embedded in IP packets 112 to uniquely identify the cloud provider, service, and tenant to which each IP packet pertains, as illustrated by way of example in FIG. 5.

Figure 5:
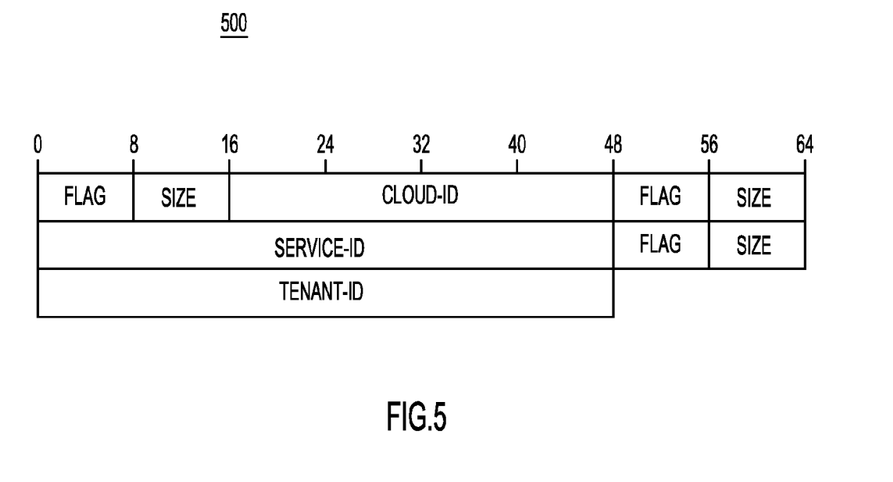
FIG. 5 is an illustration of an example header of an Internet Protocol (IP) packet that includes a cloud-ID, a service-ID, and a tenant-ID, according to an example embodiment.

With reference to FIG. 5, there is an illustration of an example header 500 of an IP packet that includes a cloud-ID, a service-ID, and a tenant-ID, which may be formatted as described above in connection with FIGS. 2, 3, and 4, respectively. Header 500 includes "flag" fields that are additional fields to indicate en-route behavior of the network devices which handle the IP packets that contain the header. For example, one of the flags may indicate to a network device not to drop an IP packet containing header 500 even if the network device does not understand the cloud-ID, service-ID, and tenant-ID fields in the header. In an embodiment, in which IPv6 packets are exchanged between tenants 102, cloud providers 104, and services 108, header 500 may be included in an IPv6 packet extension header of the IPv6 packet. In another embodiment, in which IPv4 packets are exchanged between tenants 102, cloud providers 104, and services 108, header 500 may be part of headers of the IPv4 packets.

Figure 6:
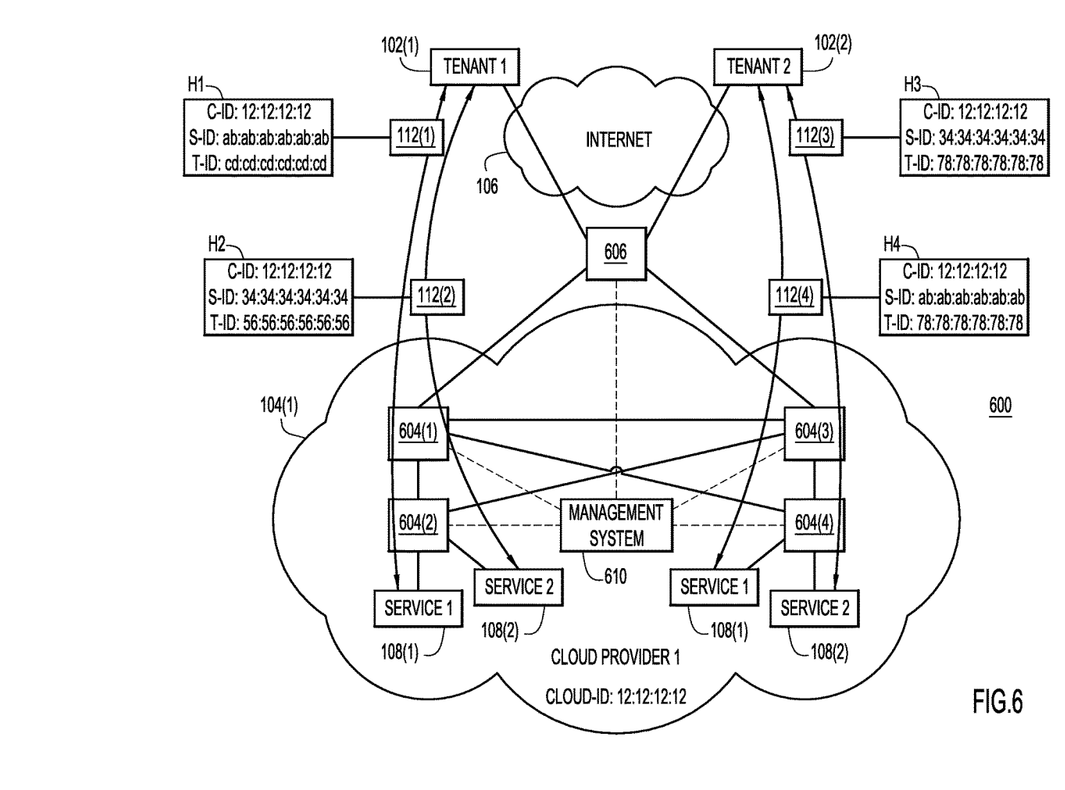
FIG. 6 is an illustration of another example cloud computing environment, according to an embodiment.

With reference to FIG. 6, there is an illustration of an example network environment 600 that expands on a portion of environment 100 focused on cloud provider 104(1), tenants 102(1) and 102(2), and cloud services 108(1) and 108(2). Environment 600 also includes network devices, e.g., network switches 604 and a router 606, to switch and route IP packets between tenants 102 and cloud services 108, and a management system 610 to manage the various cloud, service, and tenant-IDs discussed above. In the example of FIG. 6, the cloud-ID (C-ID), service-IDs (S-IDs), and tenant-IDs (T-IDs) have been assigned as follows:

a. Cloud provider 1 is assigned cloud-ID 12:12:12:12;
b. Cloud services 1 and 2 are assigned S-IDs ab:ab:ab: ab:ab:ab and 34:34:34:34:34:34, respectively;
c. Tenant 1 is assigned T-IDs cd:cd:cd:cd:cd:cd and 56:56: 56:56:56:56 for cloud service 1 and 2, respectively; and
d. Tenant 2 is assigned T-IDs 78:78:78:78:78:78 and 78:78:78:78:78:78 (i.e., the same T-ID) for cloud services 1 and 2, respectively.

Management system 610 manages the above-mentioned cloud, service, and tenant-IDs. Management system 610 may maintain a centralized store of all of the cloud, service, and tenant-IDs, and update the IDs when various ones of the cloud, service, and tenant-IDs are added and removed as services and tenants and added and removed. Management system 610 may also distribute the various cloud, service, and tenant-IDs stored therein to tenants 102 (e.g., tenants 1 and 2), and other components of cloud provider 1, such as switches 604 and router 606, to enable the switches and routers to appropriately route packets 112 between tenants and services. In addition, management system 610 (and other components of cloud provider 1) may distribute the cloud, service, and tenant-IDs outside of cloud provider 1, e.g., to other cloud providers and cloud provider networks, as necessary to implement methods described herein.

In the example of FIG. 6, tenants 1 and 2 are each registered for services 1 and 2 and access the services via exchanges of IP packets 112 with the services. As indicated in FIG. 6, switches 604 and router 606 switch and route: IP packets 112(1) between the endpoints tenant 1 and service 1; IP packets 112(2) between the endpoints tenant 1 and service 2; IP packets 112(3) between the endpoints tenant 2 and service 2; and IP packets 112(4) between the endpoints tenant 2 and service 1. IP packets 112(1)-112(4) include respective UCC headers H1-H4. Each header Hi includes a corresponding cloud-ID, service-ID, and tenant-ID as indicated in FIG. 6 based on the assigned cloud, service, and tenant-IDs.

Figure 7:
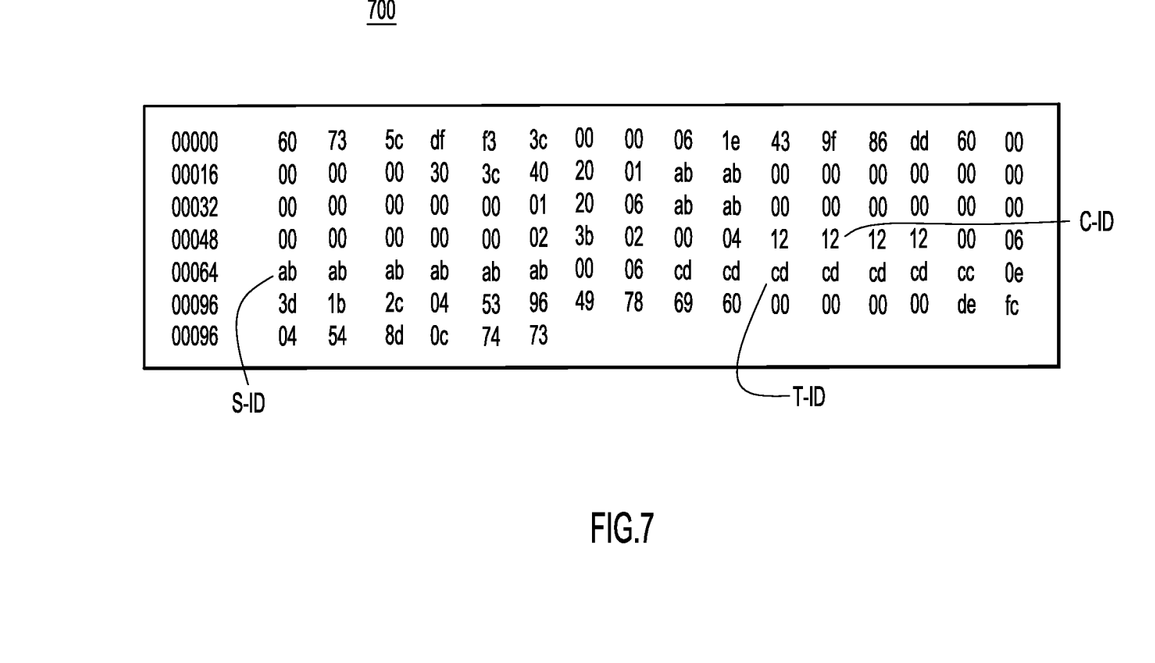
FIG. 7 is an illustration of an example header of an IP packet used in the example environment of FIG. 6 and that includes a cloud-ID, a service-ID, and a tenant-ID, according to an example embodiment.

With reference to FIG. 7, there is an illustration of an example IP packet header 700 used in the environment of FIG. 6. The contents of IP header packet header 700 are shown in hexadecimal format. IP packet header 700 may be an IPv6 extension header or an IPv4 header, for example.

Figure 8:
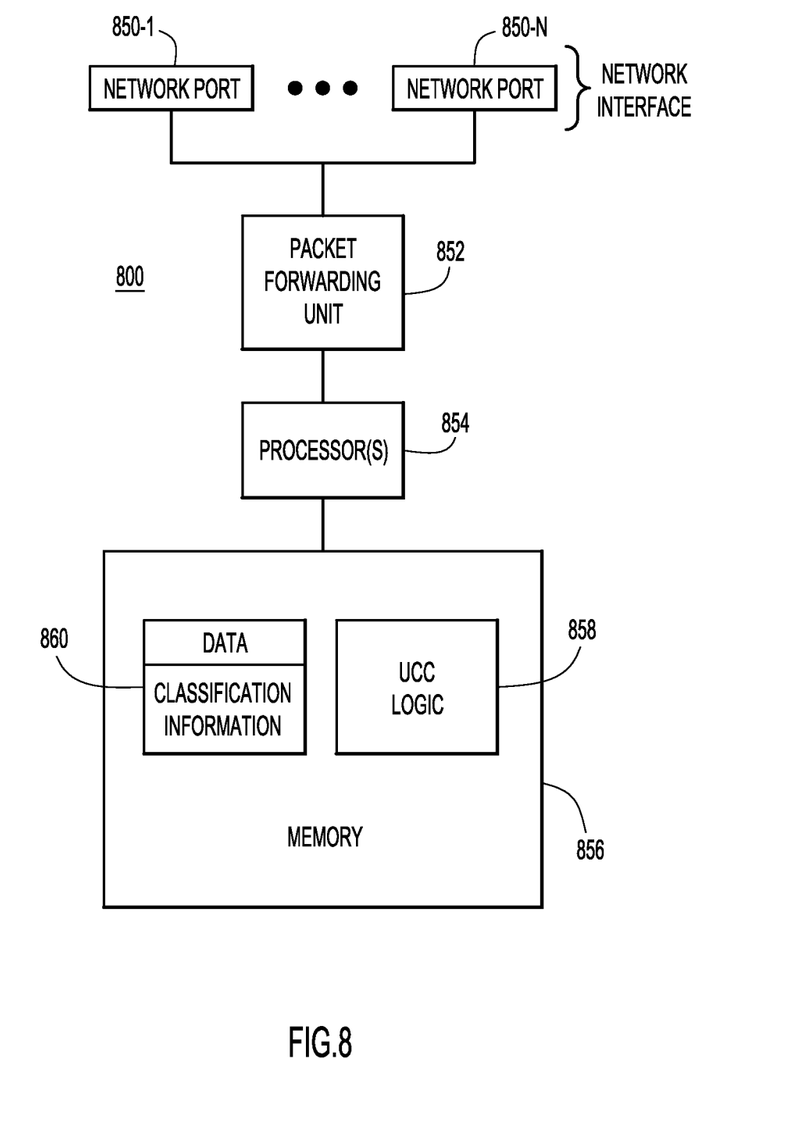
FIG. 8 is a block diagram of an example computer system to perform methods described herein, according to an example embodiment.

With reference to FIG. 8, there is a block diagram of a computer device or system 800 to implement embodiments described herein. Computer device 800 may be a network device, such as a router or switch, or a dedicated server. Computer device 800 may also represent management system 610. To this end, computer device 800 may include a plurality of network ports 850-1 through 850-N or other form of network interface (also referred to as a "network interface unit"), a packet forwarding unit 852 if the computer device is as switch or router, a processor 854 (or multiple processors) and memory 856. The memory stores instructions for implementing methods related to UCC.

The memory 856 may comprise read only memory (ROM), random access memory (RAM), magnetic disk storage media devices, optical storage media devices, flash memory devices, electrical, optical, or other physical/tangible (non-transitory) memory storage devices. The processor 854 is, for example, a microprocessor or a microcontroller that executes instructions stored in memory. Thus, in general, the memory 856 may comprise one or more tangible computer readable storage media (e.g., a memory device) encoded with software comprising computer executable instructions and when the software is executed (by the processor 854) it is operable to perform the operations described herein. Memory 856 may store UCC logic 858 to implement the methods related to UCC. The memory may also store data 860 used and generated by UCC logic 858, such as IP addresses, and classification information, including cloud, service, and tenant-IDs.

Figure 9:
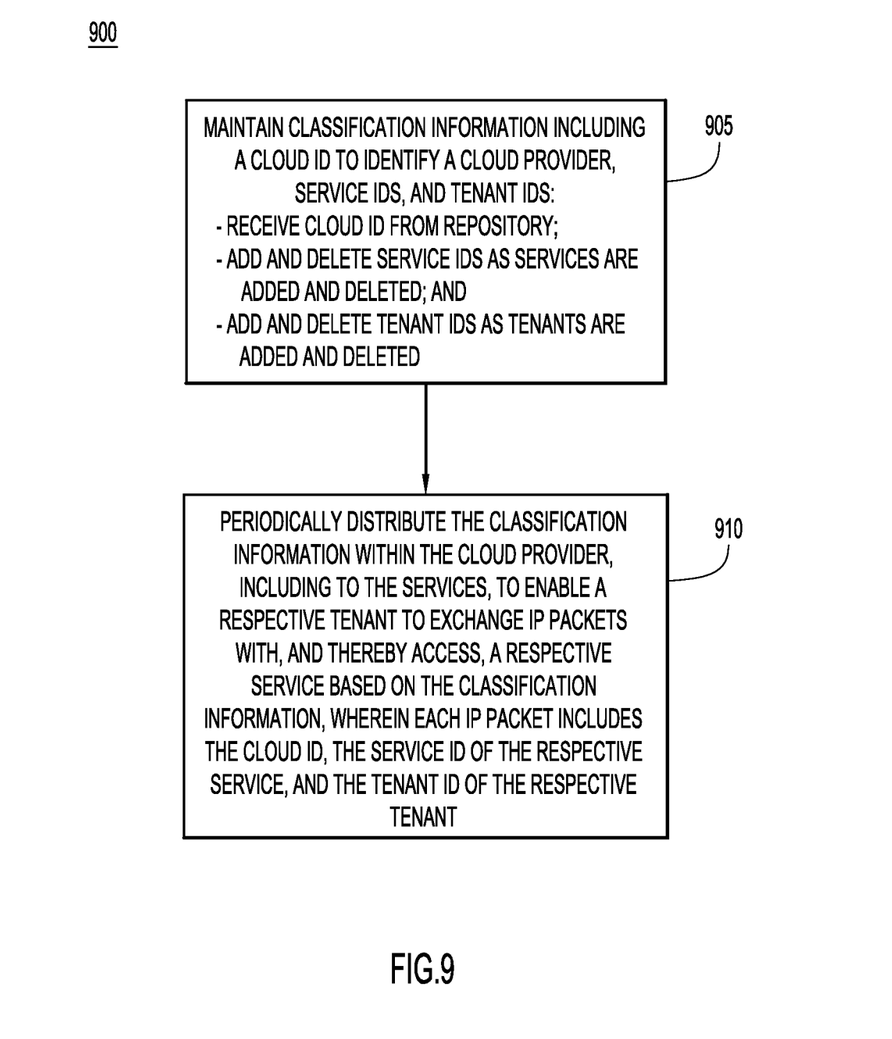
FIG. 9 is a flowchart of a method of establishing, managing, and using cloud-IDs, service-IDs, and tenant-IDs, according to an example embodiment.

With reference to FIG. 9, there is a flowchart of a method 900 of establishing, managing, and using UCC IDs. In an embodiment, management system 610 performs method 900. It is assumed that management system 610 receives one or more cloud-IDs to identify the cloud provider (e.g., cloud provider 1) in which the management system resides from a centralized, DNS-like, system that manages assignment of cloud-IDs to geographically distributed cloud provider data centers.

At 905, management system 610 stores and maintains UCC classification information for the cloud provider, including the received cloud-ID, all service-IDs that identify the cloud services offered by the cloud provider, and all tenant-IDs that identify the tenants registered to the cloud services. Management system 610 maps each service-ID to a set of tenant-IDs that identify tenants registered to use the service identified by the service-ID. As the cloud provider adds new services and retires or deletes existing services, management system 610 adds and deletes corresponding service-IDs, accordingly. Also, as the cloud provider registers new tenants to and de-registers existing tenants from the cloud provider services, management system 610 adds and deletes corresponding tenant-IDs, accordingly. In this way, management system 610 dynamically updates the various UCC IDs stored by the management system.

At 910, management system 610 periodically distributes the classification information (cloud-ID, service-IDs, and tenant-IDs) within the cloud provider, for example, the management system distributes the classification information to the services of the cloud provider and to the network devices (switches and routers) of the cloud provider. Management system 610 may also distribute the classification information to tenants that register with the cloud provider, e.g., that register with the various services. Management system 610 may distribute the classification information at scheduled intervals, or each time the management system updates the various IDs. In addition, as mentioned above, management system 610 may distribute the classification information outside of the cloud provider, for example, to tenants, services and management systems in other cloud providers, other cloud provider networks, and so on.

Management system 610 distributes the classification information as mentioned-above to enable any given tenant (e.g., a respective tenant) to exchange IP packets with, and thereby access, any given service to which the tenant is registered (e.g., a respective service) based on the classification information. Each IP packet includes the cloud-ID, the service-ID of the respective service, and the tenant-ID of the respective tenant. Network devices in the cloud provider may use the classification information distributed thereto to map ingress and egress ports of the network device between tenant-IDs of tenants and service-IDs of services to which the ports are connected. The additional, fine-grained, port mapping between tenant-IDs and service-ID is useful for purposes of switching and routing of IP packets between specific tenants and services because, at the network level, one IP address (destination or source IP address) may be mapped to many services.

The above described generic hierarchical identification scheme can be implemented in multiple ways. Both the overall size but also the bit used per sub-identifiers are flexible and can be adjusted for future-proofing. An embodiment of this generalized hierarchical identification scheme may be part of a service/transport-centric approach referred to as "Universal Cloud Classification (UCC)". As mentioned above, the UCC may be used with IPv6 extension headers, such as the hop-by-hop or the destination option header in IPv6, or with IPv4 headers, for example. The UCC incorporates the headers into the network transport layers.

The UCC can be used to enable many different use-cases critical for cloud environments (such as per-service/per-tenant billing on a network utilization basis). This hierarchical, service/transport-centric classification approach enables use-cases both cloud-(inside) and non-cloud-specific (outside):

a. Quality of Service (inside): Quality of Service is an important tool for network operators to prefer certain traffic over others. In cloud environments, QoS has to be as specific as possible to for example prioritize the video stream from a CEO over everyone else in the company. This is difficult to achieve without classification on a per-service and per-tenant pair basis. UCC introduces the requires fine-grained isolation of traffic streams therefore making it possible to apply QoS as fine-grained as possible;

b. Routing (inside): Currently, routing within a cloud-enabled data center is based on source and destination IP addresses. To be able to differentiate routes based on tenant flows, the flows have to be distinguishable by their tenant/service affiliation. UCC introduces the required isolation that routing protocols can use to introduce fine-grained per-service or per-tenant routing decisions.

c. Billing/Metering/Monitoring (inside): For a cloud provider it is crucial to not only meter and monitor their network environment but also being able to bill tenants and services offered based on their network consumption. Currently, this is difficult because the network is unaware of the services and/or tenants defined in the cloud (still using VLAN or VxLAN to isolate networks). With UCC, cloud providers gain transparency in their networks and UCC allows them to introduce billing for per-service/per-tenant network utilization, accurate metering and monitoring of network entities.

d. Internet Routing of Cloud Data (outside), similar to the inside routing use-case but for inter-Autonomous Systems routing on the Internet: Autonomous Systems in BGP are exchanging information based on destination IP addresses. This has been sufficient until the introduction of Cloud Computing. With cloud computing and the offerings of many different services behind the same IP address, solely routing based on destination IP is not sufficient and adequate anymore. For the concept of InterCloud (a Cloud of clouds) routing entities require fine-grained forwarding information to make Cloud specific decisions. To start routing entities need to be able to define paths through the global network based on the destination service requirements. The extension header introduces by UCC provides per-service isolation from the source to the destination on Layer 3. These are the requirements to identify service-specific traffic.

e. Security (inside/outside): This use-case is valid for both inside and outside a Cloud Providers network. Applying security rules are is typically done against a certain entities in the network, typically identified by an IP address. With cloud environments, however, applying one security rule to an IP address is often not fine-grained enough as this IP address can serve multiple services with different security requirements. For example: a corporate IT department may want to apply security rules against different services hosted by another organization, such as Amazon. Currently, identifying those services is only possible using deep packet inspection, which introduces a large amount of delay and is not feasible. With UCC however, the IT department can apply security rules on a per-service-ID basis (even if the flows are sourced from the same Amazon address). A similar scenario can be defined for traffic within a cloud provider's network, here being most specific by applying security rules on a per-service and per-tenant basis.

f. Federated Identity (inside/outside): Federated Identity is a way to identify a certain entity across multiple identity management systems. The proposal can be leveraged to introduce a federated identity within a cloud environment.

In summary, a hierarchical end-to-end classification scheme includes three IDs (cloud/service/tenant) and is more consistent with cloud infrastructure and architecture than traditional IP endpoint-based mechanisms. These IDs are carefully selected and defined as a complete data set to solve the classification challenges and inadequacies currently seen in cloud computing. The scheme has the following characteristics and advantages: hierarchical, end-to-end, optional, flexible (cloud and non-cloud applications and use-cases), extensible (and future-proof), universal, and guaranteed uniqueness.

The scheme may be used to distinguish cloud providers globally and services and tenants per provider. The scheme solves the classification ambiguity currently existing in cloud providers, while being flexible enough to enable highly desired use-cases (such as billing, security, routing all on a per-cloud/per-service/per-tenant basis both inside and outside cloud environments). Because the scheme is hierarchical and purposely built for cloud environments, it is flexible enough to cope with cloud scales and new cloud requirements. Use of an IPv6 extension header (either based on hop-by-hop or destination option) or an IPv4 header means that the header IDs are able to be understood by state-of-the-art data center hardware.

The scheme enables many use-cases that are currently difficult or not possible due to the lack of visibility within the network layer on cloud specific entities. Further advantages include: hierarchical classification of cloud entities, tenant/service isolation, IP tuple independence, identity federation, IPv6 or IPv4 interoperability, cloud and non-cloud (outside a providers network) use-case flexibility, tenant/service mobility, tenant authentication, accounting/billing, traffic classification, Internet routing of cloud data, transport flexibility L2 transparency, application-friendly.

In summary, in one form, a method is provided at a cloud provider configured to support cloud-based services accessible to tenants of the cloud provider over a network: maintaining classification information including a cloud-identifier to identify the cloud provider, service-identifiers each to a identify a respective one of the services, and tenant-identifiers each to identify a respective one of the tenants; and distributing the classification information within the cloud provider, including to the services, to enable a respective tenant to exchange Internet Protocol (IP) packets with, and thereby access, a respective service based on the classification information, wherein each IP packet includes the cloud-identifier, the service-identifier of the respective service, and the tenant-identifier of the respective tenant.

In another form, an apparatus is provided a network interface unit to communicate with components in a cloud provider configured to support cloud-based services accessible to tenants of the cloud provider over a network: and a processor coupled to the network interface unit and configured to: maintain classification information including a cloud-identifier to identify the cloud provider, service-identifiers each to a identify a respective one of the services, and tenant-identifiers each to identify a respective one of the tenants; and distribute the classification information within the cloud provider, including to the services, to enable a respective tenant to exchange Internet Protocol (IP) packets with, and thereby access, a respective service based on the classification information, wherein each IP packet includes the cloud-identifier, the service-identifier of the respective service, and the tenant-identifier of the respective tenant.

In yet another form, a non-transitory processor readable medium is provided. The processor readable medium stores instructions that, when executed by a processor of a management system in a cloud provider configured to support cloud-based services accessible to tenants of the cloud provider over a network, cause the processor to: maintain classification information including a cloud-identifier to identify the cloud provider, service-identifiers each to a identify a respective one of the services, and tenant-identifiers each to identify a respective one of the tenants; and distribute the classification information within the cloud provider, including to the services, to enable a respective tenant to exchange IP packets with, and thereby access, a respective service based on the classification information, wherein each IP packet includes the cloud-identifier, the service-identifier of the respective service, and the tenant-identifier of the respective tenant.

The above description is intended by way of example only.

What is claimed is:

1. A method comprising:
at a cloud provider configured to support cloud-based services accessible to tenants of the cloud provider over a network:
maintaining classification information including a cloud-identifier to identify the cloud provider, service-identifiers each to a identify a respective one of the services, and tenant-identifiers each to identify a respective one of the tenants; and
distributing the classification information within the cloud provider, including to the services, to enable a respective tenant to exchange Internet Protocol (IP) packets with, and thereby access, a respective service based on the classification information, wherein each IP packet includes the cloud-identifier, the service-identifier of the respective service, and the tenant-identifier of the respective tenant.

2. The method of claim 1, wherein:
the maintaining includes updating the service-identifiers and the tenant-identifiers of the classification information each time a new service is added or an existing service is removed from the cloud provider and each time a new tenant is added or an existing tenant is removed.

3. The method of claim 1, wherein:
the cloud provider includes servers to host the services and network devices to provide connectivity between the services and the network; and
the distributing includes distributing the classification information to the network devices to enable the network devices to route IP packets between the respective service and the respective tenant based on the classification information distributed to the network devices and included in the IP packets.

4. The method of claim 3, further comprising, at one of the network devices:
receiving from the respective service an outbound IP packet destined for the respective tenant, and from the respective tenant an inbound IP packet destined for the respective service, each IP packet including the cloud provider identifier, the service-identifier of the respective service, and the tenant-identifier of the respective tenant; and
forwarding the outbound IP packet to the respective tenant and the inbound IP packet to the respective service.

5. The method of claim 1, wherein the cloud-identifier includes an identifier of a geographical region of the cloud provider, and a unique cloud provider identifier.

6. The method of claim 5, wherein the service-identifier includes a cloud provider data center identifier, and an identifier of the services in the data center.

7. The method of claim 1, wherein each IP packet includes, in addition to source and destination IP addresses corresponding to the respective tenant and the respective service, an IP packet header field that includes the cloud-identifier, the respective service-identifier, and the respective tenant-identifier.

8. The method of claim 7, wherein each IP packet is an IP packet formatted according to IPv4 or IPv6.

9. An apparatus comprising:
a network interface unit to communicate with components in a cloud provider configured to support cloud-based services accessible to tenants of the cloud provider over a network: and
a processor coupled to the network interface unit and configured to:
maintain classification information including a cloud-identifier to identify the cloud provider, service-identifiers each to a identify a respective one of the services, and tenant-identifiers each to identify a respective one of the tenants; and
distribute the classification information within the cloud provider, including to the services, to enable a respective tenant to exchange Internet Protocol (IP) packets with, and thereby access, a respective service based on the classification information, wherein each IP packet includes the cloud-identifier, the service-identifier of the respective service, and the tenant-identifier of the respective tenant.

10. The apparatus of claim 9, wherein the processor is configured to maintain by:
updating the service-identifiers and the tenant-identifiers of the classification information each time a new service is added or an existing service is removed from the cloud provider and each time a new tenant is added or an existing tenant is removed.

11. The apparatus of claim 9, wherein:
the cloud provider includes servers to host the services and network devices to provide connectivity between the services and the network; and
the processor is configured to distribute by distributing the classification information to the network devices to enable the network devices to route IP packets between the respective service and the respective tenant based on the classification information distributed to the network devices and included in the IP packets.

12. The apparatus of claim 9, wherein the cloud-identifier includes an identifier of a geographical region of the cloud provider, and a unique cloud provider identifier.

13. The apparatus of claim 12, wherein the service-identifier includes a cloud provider data center identifier, and an identifier of the services in the data center.

14. The apparatus of claim 9, wherein each IP packet includes, in addition to source and destination IP addresses corresponding to the respective tenant and the respective service, an IP packet header field that includes the cloud-identifier, the respective service-identifier, and the respective tenant-identifier.

15. A non-transitory computer readable storage media encoded with instructions that, when executed by a processor of a management system in a cloud provider configured to support cloud-based services accessible to tenants of the cloud provider over a network, cause the processor to:
maintain classification information including a cloud-identifier to identify the cloud provider, service-identifiers each to a identify a respective one of the services, and tenant-identifiers each to identify a respective one of the tenants; and distribute the classification information within the cloud provider, including to the services, to enable a respective tenant to exchange IP packets with, and thereby access, a respective service based on the classification information, wherein each IP packet includes the cloud-identifier, the service-identifier of the respective service, and the tenant-identifier of the respective tenant.

16. The computer readable storage media of claim 15, wherein the instructions to cause the processor to maintain include instructions to cause the processor to update the service-identifiers and the tenant-identifiers of the classification information each time a new service is added or an existing service is removed from the cloud provider and each time a new tenant is added or an existing tenant is removed.

17. The computer readable storage media of claim 15, wherein:
   the cloud provider includes servers to host the services and network devices to provide connectivity between the services and the network; and
   the instructions to cause the processor to distribute include instructions to cause the processor to distribute the classification information to the network devices to enable the network devices to route IP packets between the respective service and the respective tenant based on the classification information distributed to the network devices and included in the IP packets.

18. The computer readable storage media of claim 15, wherein the cloud-identifier includes an identifier of a geographical region of the cloud provider, and a unique cloud provider identifier.

19. The computer readable storage media of claim 18, wherein the service-identifier includes a cloud provider data center identifier, and an identifier of the services in the data center.

20. The computer readable storage media of claim 15, wherein each IP packet includes, in addition to source and destination IP addresses corresponding to the respective tenant and the respective service, an IP packet header field that includes the cloud-identifier, the respective service-identifier, and the respective tenant-identifier.

* * * * *

UNITED STATES PATENT AND TRADEMARK OFFICE
CERTIFICATE OF CORRECTION

PATENT NO. : 9,729,406 B2  
APPLICATION NO. : 14/806998  
DATED : August 8, 2017  
INVENTOR(S) : Jeuk et al.

Page 1 of 1

It is certified that error appears in the above-identified patent and that said Letters Patent is hereby corrected as shown below:

On the Title Page

Item (75) Inventors:  
Add -- Shi Zhou, London, UK -- as the fourth inventor.

Signed and Sealed this  
Nineteenth Day of March, 2019

Andrei Iancu  
*Director of the United States Patent and Trademark Office*